United States Patent
Xu et al.

(10) Patent No.: US 10,952,192 B2
(45) Date of Patent: Mar. 16, 2021

(54) CONNECTED MODE DESIGN WITH BUNDLING CONSIDERATIONS

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/444,704

(22) Filed: Jul. 28, 2014

(65) Prior Publication Data

US 2015/0029923 A1     Jan. 29, 2015

Related U.S. Application Data

(60) Provisional application No. 61/859,715, filed on Jul. 29, 2013.

(51) Int. Cl.
*H04W 72/02* (2009.01)
*H04W 72/04* (2009.01)
(Continued)

(52) U.S. Cl.
CPC ..... *H04W 72/042* (2013.01); *H04W 52/0216* (2013.01); *H04W 76/28* (2018.02);
(Continued)

(58) Field of Classification Search
CPC ............. H04W 76/048; H04W 72/042; H04W 52/0216
See application file for complete search history.

(56) References Cited

U.S. PATENT DOCUMENTS

| 8,855,064 B2 | 10/2014 | Malladi et al. |
| 9,042,238 B1 * | 5/2015 | Kim ..................... H04W 76/041 370/236 |

(Continued)

FOREIGN PATENT DOCUMENTS

| CN | 103069911 A | 4/2013 |
| JP | 2012090115 A | 5/2012 |

(Continued)

OTHER PUBLICATIONS

"Bundling Frames to Save Energy While Streaming Video from LTE Mobile Device", Rajaraman et al., Oct. 4, 2013.*

(Continued)

*Primary Examiner* — Asad M Nawaz
*Assistant Examiner* — Zhaohui Yang
(74) *Attorney, Agent, or Firm* — Patterson + Sheridan, L.L.P./ Qualcomm Incorporated

(57) ABSTRACT

Aspects of the present disclosure provided techniques that may be applied in systems that utilize bundled transmissions from a base station (e.g., an eNodeB) to a user equipment (UE), when a user equipment (UE) is in a connected mode of operation. An exemplary method performed by a UE for processing a downlink control channel sent as a bundled transmission over a bundle of subframes, comprises determining when to start monitoring for the control channel; and monitoring for the control channel in a limited number of downlink subframes, based on the determination.

22 Claims, 11 Drawing Sheets

- onDurationTimer
- drx-InactivityTimer
- drx-RetransmissionTimer (one per DL HARQ process except for the broadcast process)
- the longDRX-Cycle
- the value of the drxStartOffset
- and optionally the drxShortCycleTimer and shortDRX-Cycle.

(51) Int. Cl.
*H04W 76/28* (2018.01)
*H04W 52/02* (2009.01)
*H04W 4/70* (2018.01)

(52) U.S. Cl.
CPC .......... *H04W 4/70* (2018.02); *H04W 52/0206* (2013.01); *H04W 52/0245* (2013.01); *Y02D 30/70* (2020.08)

(56) References Cited

U.S. PATENT DOCUMENTS

| | | | | |
|---|---|---|---|---|
| 2008/0077837 | A1* | 3/2008 | Lohr | H04L 1/0006 714/748 |
| 2009/0268707 | A1* | 10/2009 | Pani | H04L 1/18 370/345 |
| 2010/0002590 | A1* | 1/2010 | Park | H04W 74/006 370/241 |
| 2010/0234037 | A1* | 9/2010 | Terry | H04W 36/0016 455/450 |
| 2011/0222491 | A1 | 9/2011 | Vajapeyam et al. | |
| 2011/0312319 | A1* | 12/2011 | Lindoff | H04W 72/042 455/423 |
| 2012/0014306 | A1* | 1/2012 | Pelletier | H04W 76/048 370/311 |
| 2012/0057547 | A1* | 3/2012 | Lohr | H04L 5/0007 370/329 |
| 2013/0163507 | A1* | 6/2013 | Hoshino | H04B 7/155 370/315 |
| 2014/0098761 | A1* | 4/2014 | Lee | H04W 74/006 370/329 |
| 2014/0233541 | A1* | 8/2014 | Kim | H04L 1/1607 370/336 |
| 2015/0016311 | A1* | 1/2015 | Han | H04W 24/10 370/280 |
| 2015/0109979 | A1* | 4/2015 | Miklos | H04W 76/048 370/311 |

FOREIGN PATENT DOCUMENTS

| | | |
|---|---|---|
| JP | 2013535938 A | 9/2013 |
| JP | 2016507176 A | 3/2016 |
| WO | WO-2011088146 A1 | 7/2011 |
| WO | WO-2012021879 A2 | 2/2012 |
| WO | WO-2013005970 A2 | 1/2013 |
| WO | WO-2013055128 A2 | 4/2013 |
| WO | WO-2015017374 A1 | 2/2015 |

OTHER PUBLICATIONS

3GPP TS 36.321 version 8.8.0 Release 8 1 ETSI TS 136 321 V8.8.0 (Feb. 2010) https://www.etsi.org/deliver/etsi_ts/136300_136399/136321/08.08.00_60/ts_136321v080800p.pdf.*

International Search Report and Written Opinion—PCT/US2014/048549—ISA/EPO—Oct. 21, 2014.

LG Electronics: Cell Acquisition and Reference Signals for Coverage Limiting MTC UES 11 3GPP Draft; R1-130263 (MTC LG), 3rdGenerationPartnership Project (3GPP), Mobile Competence Centre 650, Route Des Lucioles F-06921 Sophia-Antipolis Cedex France vol. RAN WG1, No. St Julian; Jan. 28, 2013-Feb. 1, 2013 Jan. 18, 2013 (Jan. 18, 2013) XP050663395.

LG Electronics: Cell Acquisition and Reference Signals for Coverage Limiting MTC UES 11 3GPP Draft; R1-130263 (MTC LG), 3rdGenerationPartnership Project (3GPP), Mobile Competence Centre 650, Route Des Lucioles F-06921 Sophia-Antipolis Cedex France vol. RAN WG1, No. St Julian; Jan. 28, 2013-Feb. 1, 2013 Jan. 18, 2013 (Jan. 18, 2013) XP050663395, Retrieved from the Internet: URL:http://www.3gpp.org/ftpjtsg_ranjWG1_RL 1/TSGR1 72/Docs/ [retrieved on Jan. 18, 2013] paragraph [0004].

LG Electronics: "Text Proposal on Coverage Enhancement for a MTC UE (R1-130264)", 3GPP Draft, vol. RAN WG1, No. #72 Jan. 18, 2013 (Jan. 18, 2013), XP050663396, 16 Pages, 650, Route Des Lucioles; F-06921 Sophia-Antipolis Cedex; France Retrieved from the Internet: URL: http://www.3gpp.org/ftp/tsg_ran/WG1_RL1/TSGR1_72/Docs/ [retrieved on Jan. 18, 2013] sections 9.4.1 and 9.5.4; figure 1.

Samsung: "Discussion on long DRX cycle for low power MTC devices" [online], 3GPP TSG SA WG2 Meeting #87, 3GPP, Oct. 4, 2011, S2-114083, [Mar. 16, 2020], 5 Pages, URL:https://www.3gpp.org/ftp/tsg_sa/WG2_Arch/TSGS2_87_Jeju_Island/Docs/S2-114083.zip.

* cited by examiner

CONNECTED MODE DESIGN WITH BUNDLING CONSIDERATIONS

CLAIM OF PRIORITY UNDER 35 U.S.C. § 119

The present application for patent claims priority to U.S. Provisional Application No. 61/859,715, entitled, "Connected Mode Design With Bundling Considerations," filed Jul. 29, 2013, and assigned to the assignee hereof and expressly incorporated herein by reference.

BACKGROUND

Field

Certain aspects of the present disclosure generally relate to wireless communications and, more particularly, to considerations for bundled transmissions when a user equipment (UE) is in a connected mode of operation.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To enhance coverage of certain devices, such as MTC devices, "bundling" may be utilized in which certain transmissions are sent as a bundle of transmissions, for example, with the same information transmitted over multiple subframes.

SUMMARY

Certain aspects of the present disclosure provide techniques and apparatus that may be applied in systems that utilize bundled transmissions when a user equipment (UE) is in a connected mode of operation.

Certain aspects of the present disclosure provide a method of processing a downlink control channel sent as a bundled transmission over a bundle of subframes by a user equipment (UE). The method generally includes determining when to start monitoring for the control channel and monitoring for the control channel in a limited number of downlink subframes, based on the determination.

Certain aspects of the present disclosure provide a method of transmitting a downlink control channel as a bundled transmission over a bundle of subframes by a base station. The method generally includes providing information to a user equipment (UE) indicating when to start monitoring for the control channel and sending the downlink control channel as a bundled transmission.

Numerous other aspects are provided including methods, apparatus, systems, computer program products, and processing systems.

DETAILED DESCRIPTION

Aspects of the present disclosure provide techniques that may be applied in systems that utilize bundled transmissions when a user equipment (UE) is in a connected mode of operation. For example, the techniques may help a UE determine when to start monitoring for certain control channels when bundling is enabled and such control channels are transmitted in a limited number of subframes.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
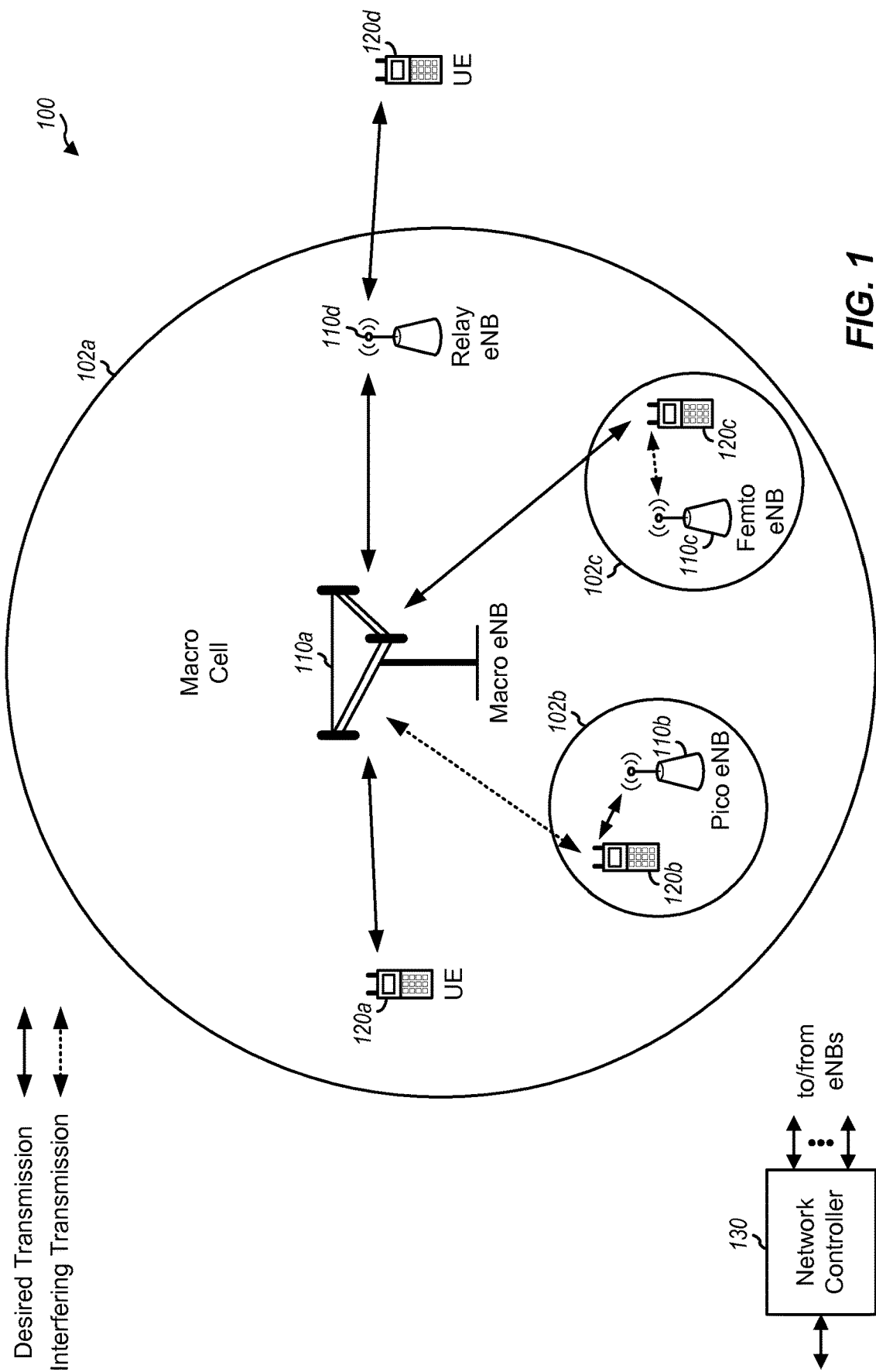
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs shown in FIG. 1 determine when to start monitoring for certain control channels when bundling is enabled.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
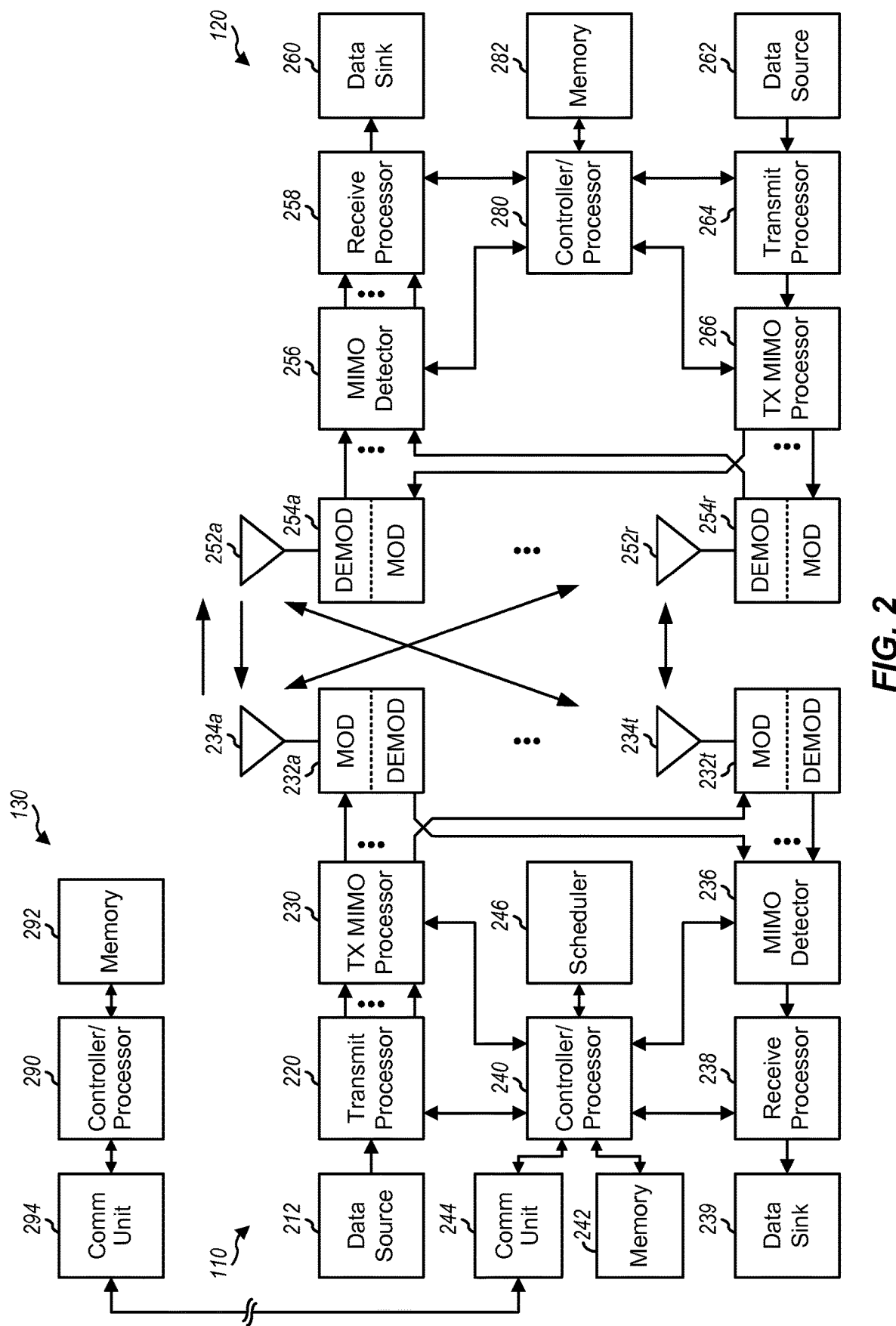
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 240 and/or other processors and modules at base station 110 may perform direct operations 1100 shown in FIG. 11. Similarly, processor 280 and/or other processors and modules at UE 120, may perform or direct operations 1000 shown in FIG. 10. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle are precoded with a common precoding matrix. That is, reference signals such as UE-RS and/or data in the resource blocks may be precoded using the same precoder. The power level used for the UE-RS in each RB (resource block) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
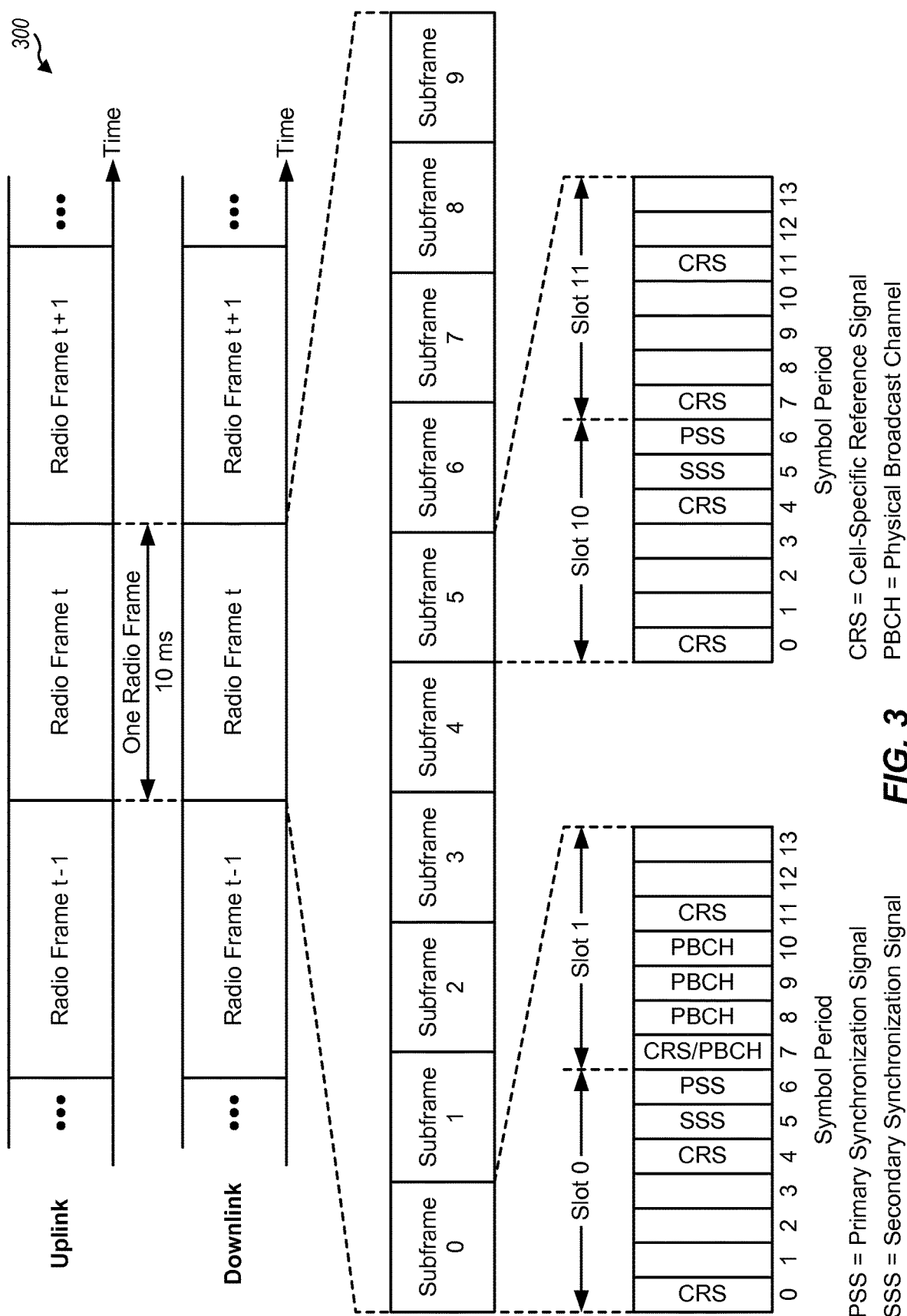
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
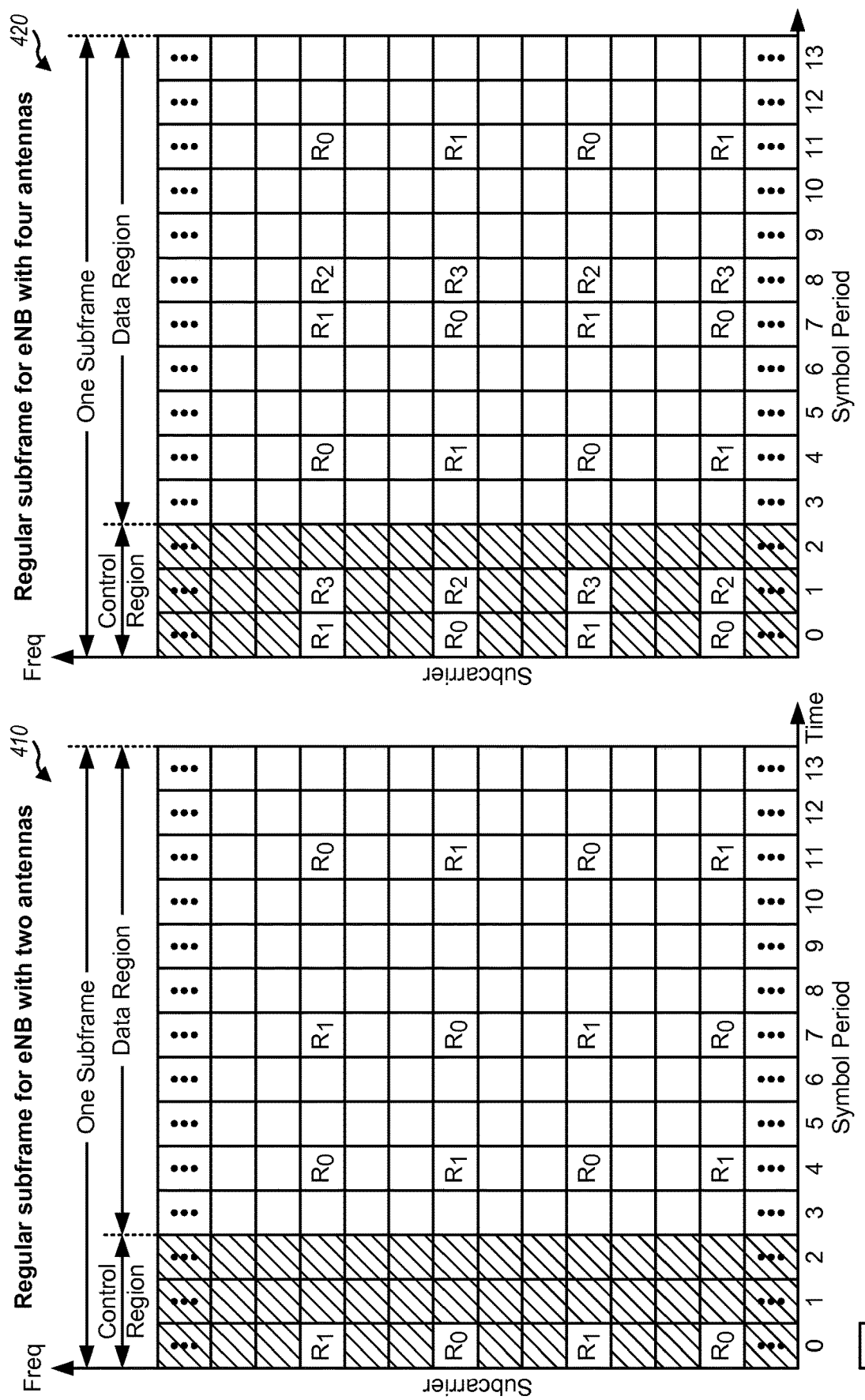
FIG. 4 is a block diagram conceptually illustrating two exemplary subframe formats with the normal cyclic prefix

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Connected Mode Design with Bundling Considerations

Power consumption is an important consideration for a smartphone and many other mobile devices. Various mechanisms have been designed to help reduce power consumption, such as discontinuous reception (DRX) mode in long term evolution (LTE). DRX is generally designed in LTE to allow efficient power saving while in radio resource control (RRC) connected mode.

Figure 5:
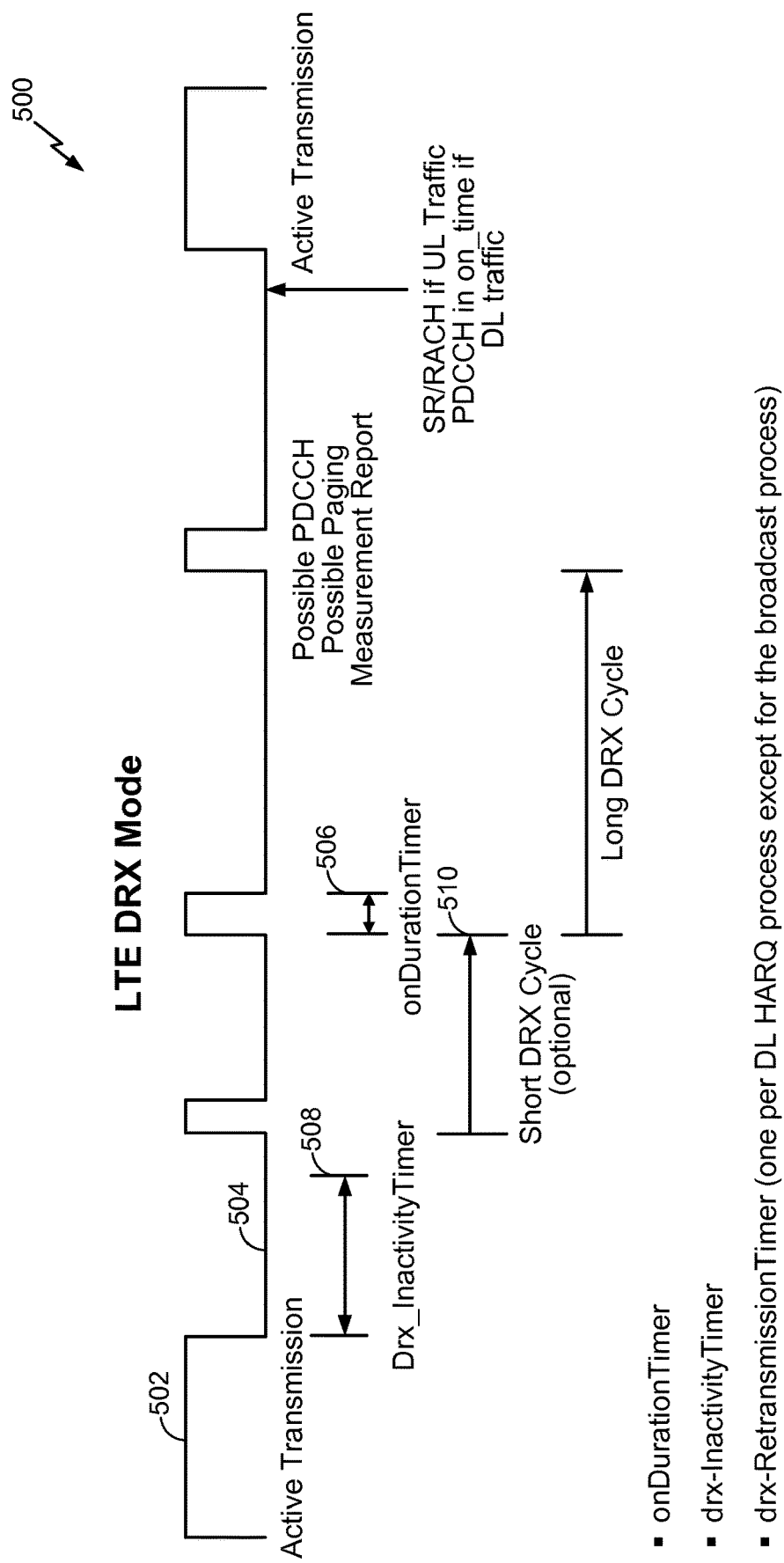
FIG. 5 illustrates example timing of a discontinuous reception (DRX) mode, in accordance with certain aspects of the present disclosure.

FIG. 5 illustrates example timing of a discontinuous reception (DRX) mode, in accordance with certain aspects of the present disclosure. As illustrated in FIG. 5, in DRX mode, a UE may alternate between active periods (e.g., Active Transmission 502) where transmission/reception is performed and inactive periods (e.g., inactive period 504) where transmission/reception is not performed. A DRX mode may operate according to certain parameters, for example, specifying On Duration (e.g., onDurationTimer 506), an Inactivity Timer (e.g., DRXInactivityTimer 508), a retransmission timer, a short DRX cycle (e.g., Short DRX Cycle 510) for certain subframes, and a short cycle timer.

TTI Bundling

In some cases, to enhance coverage, transmissions may be bundled. For example, data or control information may be transmitted over a "bundle" of subframes, which may enhance the probability of successful reception. In LTE Rel-8/9/10, transmission time interval (TTI) (or subframe) bundling may be configured on a per UE basis. The subframe bundling operation may be configured (e.g., by the parameter, ttiBundling) by higher layers.

If TTI bundling is configured for a UE, the subframe bundling operation may be applied to uplink share channel (UL-SCH), but may not be applied to other UL signals/traffic (e.g., uplink control information). According to certain aspects, the bundling size may be fixed, for example, at 4 subframes, meaning the physical uplink shared channel (PUSCH) may be transmitted in 4 consecutive subframes. The same hybrid ARQ (HARQ) process number may be used in each of the bundled subframes. Additionally, resource allocation size may be restricted to up to 3 resource blocks (RBs) and the modulation order may be set to 2 (e.g., for QPSK). A bundle may be treated as a single resource, for example, with a single grant and a single hybrid-ARQ acknowledgement used for each bundle.

According to certain aspects, bundling may be used for low rate traffic. If VoIP packets cannot be transmitted in a single TTI due to a low uplink link budget, Layer 2 (L2) segmentation may be applied. For example, a VoIP packet may be segmented into 4 radio link control (RLC) protocol data units (PDUs) that may be transmitted in 4 consecutive TTIs and 2-3 HARQ retransmissions may be targeted to achieve sufficient coverage. However, this approach may have various drawbacks. For example, each additional segment introduces a 1 byte RLC, a 1 byte media access control (MAC) and a 3 byte layer 1 (L1) cyclic redundancy check (CRC) overhead (e.g., 15% overhead assuming a 33 byte RLC service data unit (SDU) size, which would mean for 4 segments, there is an additional L1/L2 overhead of 45%.

Additionally, according to certain aspects, HARQ transmissions and/or retransmissions for every segment may require grants on physical downlink control channel (PDCCH), which may consume significant PDCCH resources. Each HARQ transmission or retransmission may be followed by HARQ feedback on physical HARQ indicator channel (PHICH). Assuming a NACK-ACK error ratio of $10^{-3}$, a large number of HARQ feedback signals may lead to high packet loss probabilities. For example, if 12 HARQ feedback signals are sent, the HARQ feedback error ratio may be in the order of $1.2*10^{-2}$. According to certain aspects, packet loss rates of more than $10^{-2}$ may be unacceptable for VoIP traffic.

According to certain aspects, usage of only a single uplink grant and a single PHICH signal per TTI bundle, as proposed herein, may be advantageous and reduce the signaling overhead described above.

According to certain aspects, coverage improvements for medium data rate PUSCH and UL VoIP may be necessary. According to further aspects, a minimum gain of 1 dB for both the medium data rate PUSCH and the UL VoIP may be desirable, which may be achieved through TTI bundling enhancements as proposed herein. Further, both L1/Higher layer protocols overhead and latency may be considered.

According to certain aspects, a focus of the traditional LTE design has been on the improvement of spectral efficiency, ubiquitous coverage, enhanced QoS support, and the like. This typically results in high end devices, such as the state-of-art smartphones, tablets, and the like. However, low cost, low rate devices need to be supported as well. Low-cost machine type communication (MTC) UEs based on LTE may be improved based on a reduction in maximum bandwidth, a single receive RF chain, a reduction of peak rate, a reduction of transmit power, and/or a half duplex operation.

In addition to the low cost requirement, coverage enhancement (e.g., of at least 20 dB) may be required to cover low-cost devices in poor coverage areas. According to certain aspects, in order to meet this requirement, large TTI bundling may be implemented to achieve a 20 dB link budget gain. For example, on the DL, TTI bundling may be used for physical broadcast channel (PBCH), PDCCH/ePDCCH, PHICH, PDSCH. Additionally, in some cases, on the UL, TTI bundling may be used for the random access channel (RACH), physical uplink control channel (PUCCH), physical uplink shared channel (PUSCH). According to certain aspects, a bundling size of approximately 100 TTI may be used for different channels.

Connected Mode Design with Bundling Considerations

Aspects of the present disclosure provided techniques that may help a UE determine when to start monitoring for certain control channels, for example, when the UE is in a connected mode (e.g., DRX on), bundling is enabled, and such control channels are transmitted in only a limited number of subframes.

Current DRX operation is generally designed for operation with non-bundled transmission and small uplink bundling of size 4 for PUSCH. In this case, the UE may always monitor each TTI for control channel decoding. A bundling size of 4 may be desirable to all DRX operation with bundled transmissions, however. With greater bundling sizes and bundling of both DL and UL channels, there may be design challenges regarding signaling and operation, that are addressed herein, according to aspects of the present disclosure.

One design challenge is that a control channel itself may be bundled. One way to address this issue may be to set a DRX ON duration to less than the TTI bundling of the control channel. In this case, the UE may have to stay on longer than ON duration to decode the control channel. Additionally, the UE may need to buffer and blind decode a large amount of hypotheses. Another way to address the issue of a control channel being bundles may be to set the DRX ON duration to longer than the TTI bundling of the control channel. In this case, the UE may need to check all control channel possibilities.

Aspects of the present disclosure provide techniques to address issues presented to bundled transmissions when a UE is in DRX mode. Such aspects may also be extended to non-DRX operation of the UE.

According to certain aspects, DRX operation (or other active mode operation) may allow bundling but may also prohibit parallel transmission or reception of data channels with bundling. This may be accomplished by restricting the possible DL and UL grants, as shown in FIG. 6.

Figure 6:
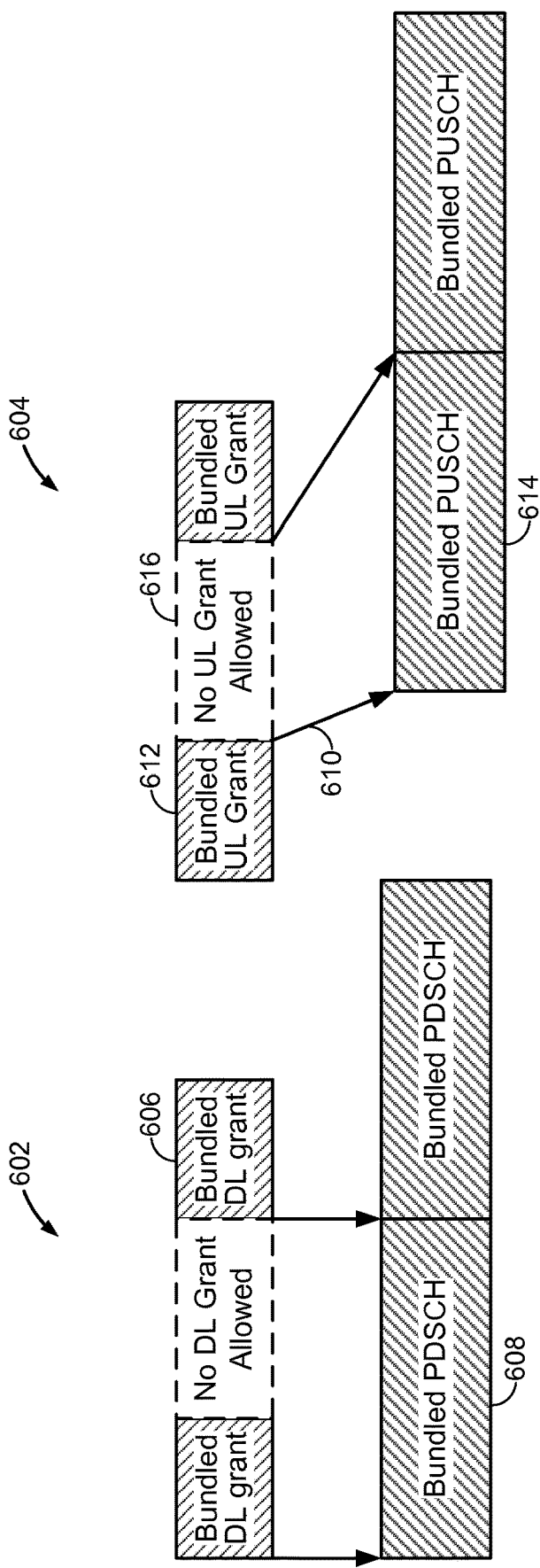
FIG. 6 illustrates an example of restricting uplink and downlink grants, in accordance with certain aspects of the present disclosure.

FIG. 6 illustrates an example of restricting uplink and downlink grants, in accordance with certain aspects of the present disclosure. For example, for DL assignment, as illustrated by 602 in FIG. 6, bundled DL grants, such as bundled DL grant 606, may not be allowed for this user before the completion of the bundled PDSCH 608. For UL assignment, as illustrated by 604 in FIG. 6, since there is an offset 610 (e.g., 4 ms) between the end of bundled UL grant 612 and beginning of the bundled PUSCH 614, there may be a region 616 where UL grants may not be allowed for this user before its bundled UL transmissions can start.

While certain aspects, described in more detail below, provide methods for determining when to start monitoring for a control channel, FIG. 6 provides an example of limiting scheduled transmissions. For example, as illustrated in FIG. 6, determining when to start monitoring for a control channel may be made, at least in part, based on a restriction on downlink grants designed to prevent parallel reception of data, or a restriction on uplink grants designed to prevent parallel transmission of data.

Figure 7:
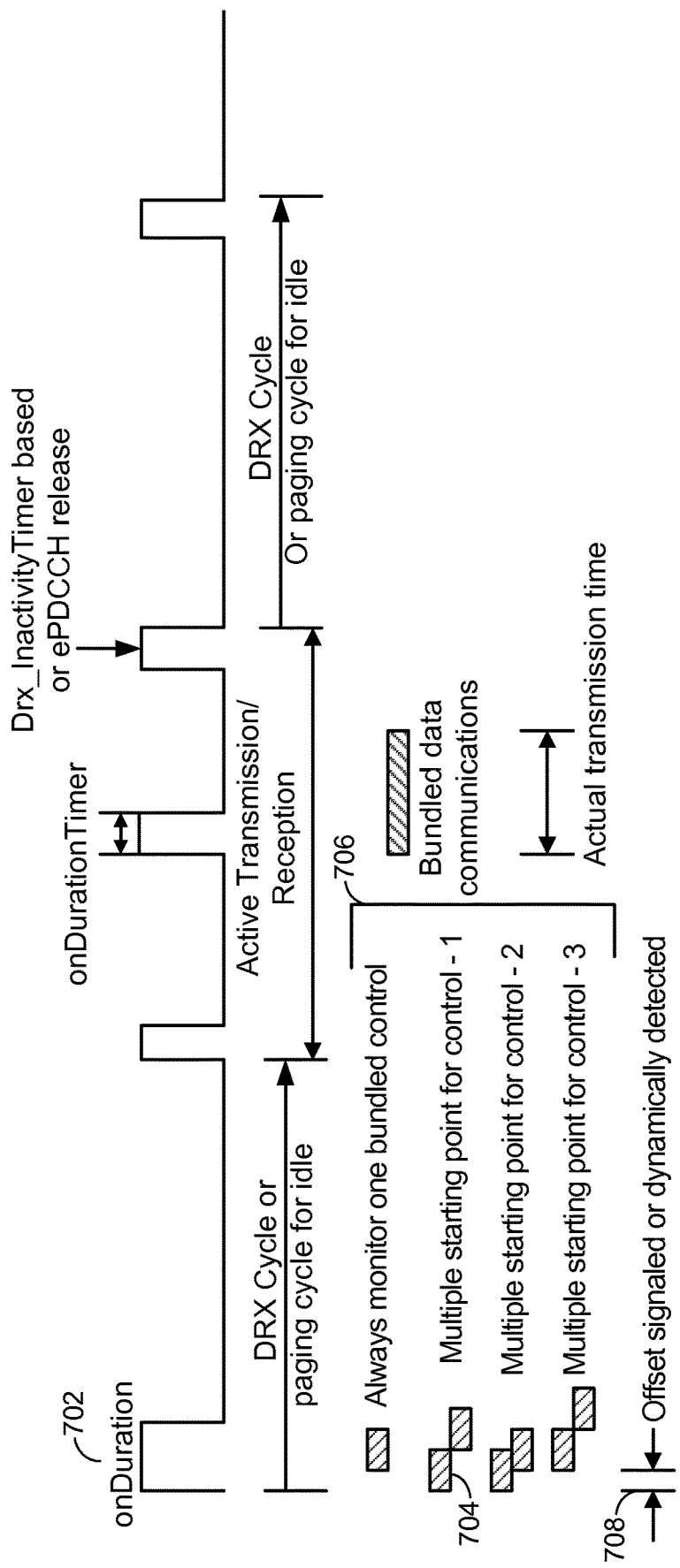
FIG. 7 illustrates an example scenario in which an on duration of a DRX cycle is longer than a TTI bundling period, in accordance with certain aspects of the present disclosure.

FIG. 7 illustrates the case where the DRX ON duration 702 is longer than TTI bundling 704 of a control channel. In this case, the ON duration may indicate one or multiple starts (e.g., multiple starting points 706) of the bundled control channel transmissions. A starting position of the (bundled) control channel may be separated by 1 or multiple TTIs (e.g., offset 708) or may be the same as the bundle size. Additionally, the UE may adjust a DL control (e.g. PDCCH/ePDCCH) monitoring time according to the bundle size.

Figure 8:
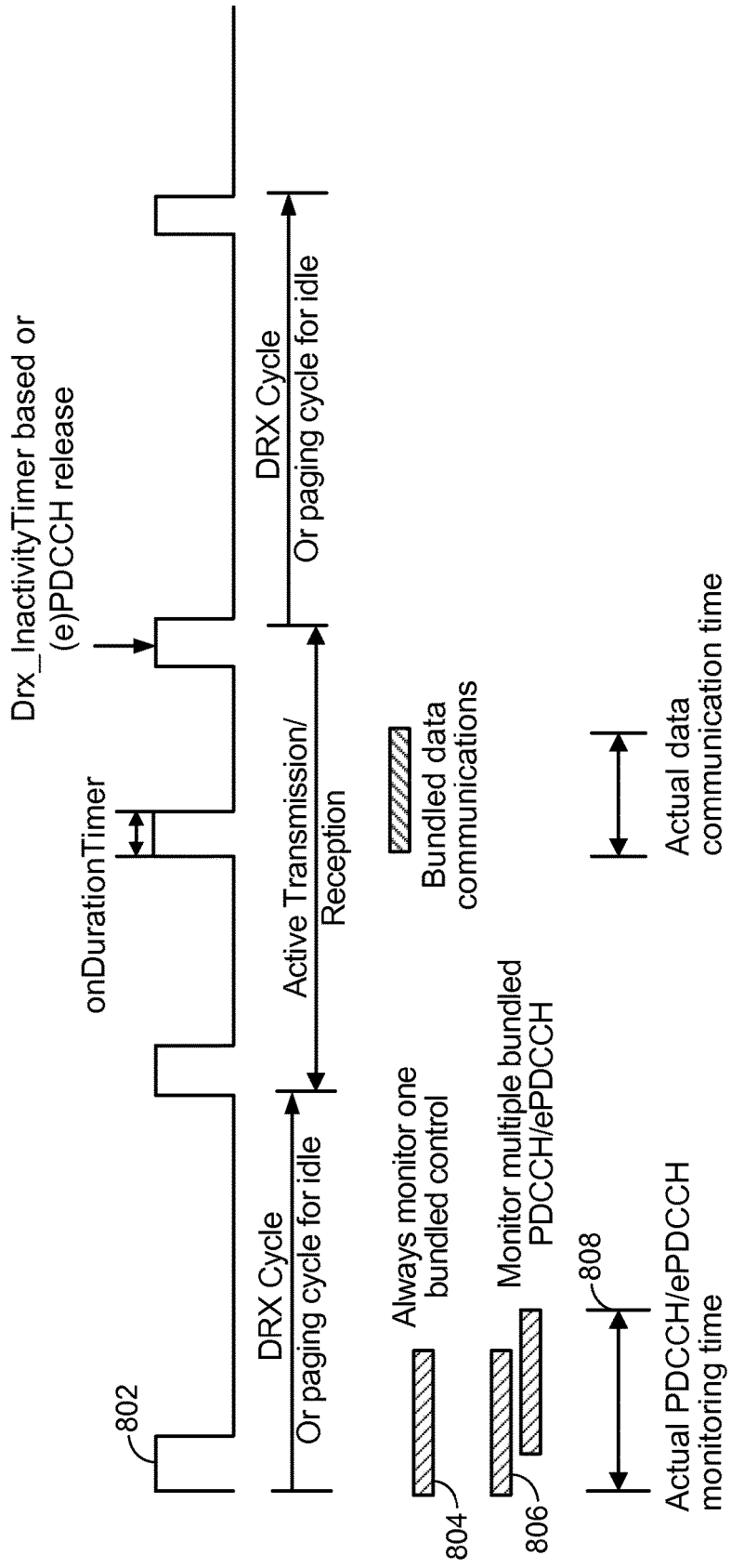
FIG. 8 illustrates an example scenario in which an on duration of a DRX cycle is shorter than a TTI bundling period, in accordance with certain aspects of the present disclosure.

FIG. 8 illustrates the case where the DRX ON duration 802 is shorter than TTI bundling 804 of control channel. Again, the ON duration may indicate one or multiple starts (e.g., multiple starting points 806) of the bundled control channel transmissions. A starting position of the (bundled) control channel may be separated by 1 or multiple TTI or may be the same as the bundle size. Additionally, the UE may adjust a DL control (e.g. PDCCH/ePDCCH) monitoring time 808 according to the bundle size.

In order to efficiently monitor for a bundled control channel (and avoid having to monitor all possible locations), the UE may need to determine possible starting points (positions) for the bundled control channels.

According to certain aspects, a UE may monitor for one bundled control channel, regardless of the actual duration of the DRX ON period. According to certain aspects, the starting point of a bundled control channel may be aligned with the first TTI of the ON duration. In some cases, a base station (eNB) may configure the ON duration to 1 ms to align with subframes. According to aspects, the starting point may be aligned with an offset K from the start of the ON duration.

According to certain aspects, the actual UE awake time may depend on the bundling size for both data and control. In some cases, after the UE successfully decodes a bundled control channel, it may have the option to stop monitoring for energy saving purposes.

According to certain aspects, there may be multiple offset starting points. In this case, a UE ON duration may provide multiple starting points for a bundled PDCCH or evolved/enhanced PDCCH (ePDCCH). According to certain aspects, the UE may assume bundled PDCCH/ePDCCH can start from any TTI within the ON duration (e.g., with the starting position is separated by 1 TTI). In some cases, the UE may assume that a bundled PDCCH/ePDCCH can start from multiple starting positions separated by more than 1 TTI. As an example, with an ON duration of 16 and a bundle size of 20, the UE starting position may separated by 8 with positions 0, 8. While a starting position of 8 is provided as an example separation to limit the number of starting positions, a shorter or longer separation may be used.

In some cases, when the ON duration is longer than the TTI bundling size, such as illustrated in FIG. 7, the UE may assume the starting point is separated by the same amount as the TTI bundling size. As an example, with an ON duration of 16 and bundle size of 4, the UE starting positions may be 0, 4, 8, and 12 during the ON duration. As another example, with an ON duration of 100 ms and bundle size of 16, the starting point of PDCCH/ePDCCH may be a multiple of 16. In this case, there may be a first decoding of bundled PDCCH/ePDCCH from TTIs 0-15, and a second decoding of bundled PDCCH/ePDCCH from TTIs 16-31. As another example, the starting position may also be a fixed offset from 0, such as 5, 21, 37 (assuming a 16 TTI separation).

According to certain aspects, there may be a dynamic offset determination. In this case, the UE may try to decode a bundled control channel from each of the TTIs in the ON duration until it determines the correct offset as the starting position. After the UE determines the correct offset, it may perform a single bundled PDCCH/ePDCCH decoding or perform multiple PDCCH/ePDCCH decodings separated at a step size of K.

Figure 9:
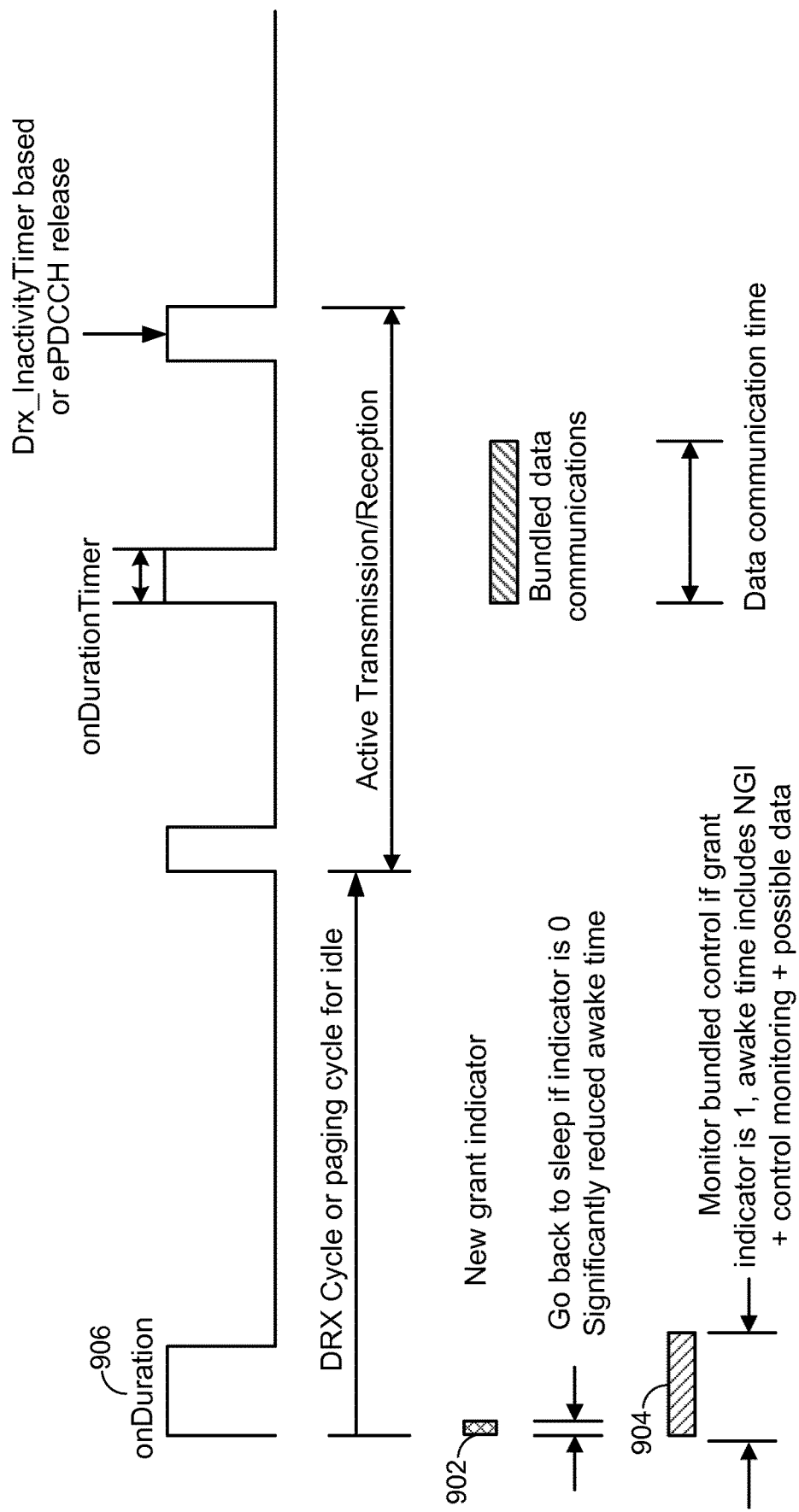
FIG. 9 illustrates an example grant indication, in accordance with certain aspects of the present disclosure.

As illustrated in FIG. 9, according to certain aspects, a grant indicator 902 may be used to signal to a UE there is an upcoming bundled control transmission (e.g., bundled control transmission 904). As illustrated, the grant indicator may be transmitted during an ON duration (e.g., ON duration 906). The UE may monitor for this grant indicator and take and appropriate action. For example, the UE may go back to sleep if the indicator is 0 (no bundled control) or stay awake to monitor for a bundled control channel if the indicator is 1 (control plus possible data). In many cases, this may significantly reduce awake time and corresponding power consumption.

According to certain aspects, the grant indicator may be provided via a new channel with one or more bits to indicate UE whether there is a bundled grant. As noted above, this may provide energy saving for UEs that do not have grants most of the time and do not have to monitor the bundled transmissions.

According to certain aspects, there are various options for the design of such a grant indicator. For example, regarding payload, a new one bit format to indicate that there is grant for bundled transmission may be used. In some cases, there may be more bits, for example, to split users into groups to indicate whether there is a bundled DL transmission for individual group of users.

Regarding transmission format, there may be no cyclic redundancy check (CRC). Further, according to certain aspects, to indicate whether there is need to wake up or not, a narrowband ePDCCH type of indication with power boosting may be used, with 1 RB to carry 2-4 bits, simplex coding (e.g., can use ePDCCH grid). As noted above, the UE may monitor this new grant indicator 902 and, if the bit is turned on (i.e., the grant indicator 902 is set to 1) for the group, continue to monitor for a bundled control. According to certain aspects, if the bit is off (i.e., the grant indicator 902 is set to 0) for the group, the UE may go back to sleep.

In addition to or as an alternative to a separate grant indicator, when there is DL control or data transmission, one or more bits may be added to the control or data channel to indicate whether there is need to continue monitor DL control or immediately go back to sleep. According to certain aspects, in the case where the ON duration is no less than the control channel TTI bundling size, there may only be a little additional power consumption to stay ON for the entire TTI duration since the UE has to monitor the entire TTI duration anyway. According to certain aspects, for the case where the ON duration is less than TTI bundling size, for simplicity, a UE (e.g., an MTC device) may only monitor a limited number of bundled TTI transmissions.

According to certain aspects, various techniques may be used to signal parameters that a UE may use to decide how to monitor for bundled control channels. As an example, an eNB may signal different sets of DRX parameters for a UE with and without extended bundling (beyond Rel 8 defined bundling). According to certain aspects, a first set of parameters may apply to UEs without bundling and limited legacy bundling design (e.g., Rel 8 UL bundling with size 4). According to further aspects, a second set of parameters may apply to a UE with new extended bundling, including DL channel bundling and MTC bundling. For example, for UEs supporting extended bundling, the eNB may signal a UE a different starting point and duration for DRX operation as compared to UEs that do not support bundling and limited legacy bundling design.

As another example, a similar signaling mechanism may be used, but the UE may interpret the signaling differently depending on the bundling. For example, the eNB may still signal an ON duration of 20 ms for a UE with a bundling size of 16, and the UE may monitor for control at TTI=0 and TTI=16 for two possible PDCCH/ePDCCH starting points.

According to certain aspects, bundling may be applied to DL control, DL data, UL control and UL data. Thus far, mainly bundled DL control channel monitoring has been considered. However, regardless of DL or UL direction, as long as UE is in transmission or reception, the UE may enter active state instead of DRX. Therefore, the UE may have to monitor DL control. As noted above, for large TTI bundling, monitoring PDCCH/ePDCCH with each TTI as starting point may be computational intensive.

According to certain aspects, however, by utilizing techniques presented herein, even in active state, a UE may be signaled to monitor bundled PDCCH/ePDCCH only in certain TTIs (e.g., and not monitoring PDCCH/ePDCCH starting from each TTI). As an example, a UE may be transmitting UL with a bundle size of M=16 in subframes 0 to 15 and also monitoring a PDCCH each TTI with a bundling size N=8, a UE may learn (via specification or signaling) that it may only need to monitor PDCCH at subframe 0 and subframe 7. Similarly, if a UE is receiving a bundled PDSCH, then it may not need to monitor all bundled PDCCH/ePDCCH starting in every TTI.

According to certain aspect, while the example techniques presented above have been in the context of DRX operation, these techniques may be extended to a connected UE without DRX operation as well. For example, a UE may have a fixed starting point for bundled control monitoring or a different offset for bundled PDCCH/ePDCCH monitoring instead of monitoring control starting from each TTI. Further, according to certain aspects, there may be a linkage between the starting point of bundled transmissions for the PDCCH/ePDCCH and PDSCH.

Figure 10:
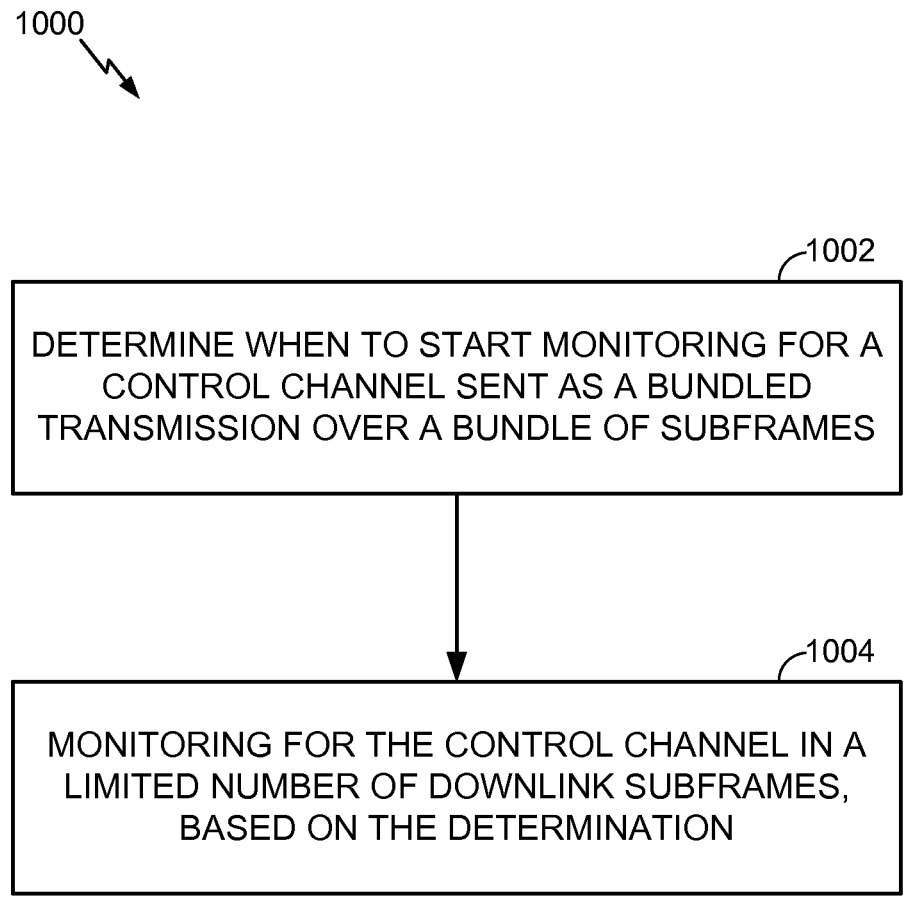
FIG. 10 illustrates example operations for wireless communications, by a user equipment (UE), in accordance with certain aspects of the present disclosure.

FIG. 10 illustrates example operations 1000 performed by a user equipment (UE), such as UE 120, for processing a downlink control channel sent as a bundled transmission over a bundle of subframes. The operations 1000 begin, at 1002, with the UE determining when to start monitoring for the control channel. At 1004, the UE monitors for the control channel in a limited number of downlink subframes, based on the determination.

According to certain aspects, the UE may receive a downlink channel set as a bundled transmission over a bundle of subframes. The UE may also cease to monitor for downlink control channels, within the on duration, after successful decoding of a downlink control channel, which may help conserve processing power.

According to certain aspects, the UE may determine when to start monitoring for the control channel based, at least in part, on a restriction on downlink grants designed to prevent parallel reception of data and/or or a restriction on uplink grants designed to prevent parallel transmission of data.

According to certain aspects, the UE may determine, within an on duration of a discontinuous reception (DRX) operating mode, when to start monitoring for the control channel. In some cases, the determining comprises determining multiple possible starting positions for monitoring for the control channel within the on duration.

According to certain aspects, the UE may determine a starting position for monitoring that is at least one of: aligned with a first transmission time interval (TTI) of the on duration; or aligned with an offset period from a start of the on duration. In some cases, multiple possible starting positions may be separated by at least one transmission time interval (TTI). In some cases, the on duration may be longer than a bundling size of the downlink control channel and the possible starting positions are separated by the bundling size.

According to certain aspects, a UE ma determine a start position by decoding in the on duration until downlink control channel is successfully decoded and decoding one or more subsequent downlink control channels based on the start position. According to certain aspects, a UE may determine when to start monitoring for the control channel based on signaling of parameters for the DRX operating mode.

According to certain aspects, the UE may receive signaling indicating a bundled transmission is to follow and determine a start position based on this signaling. In such cases, the UE may cease to monitor for downlink control channels, for at least some period, in monitoring instances after such signaling is not received. Such signaling may be provided via one or more bits in a control channel indicating a bundled grant. According to certain aspects, the signaling is provided via one or more bits of a control or data transmission.

Figure 11:
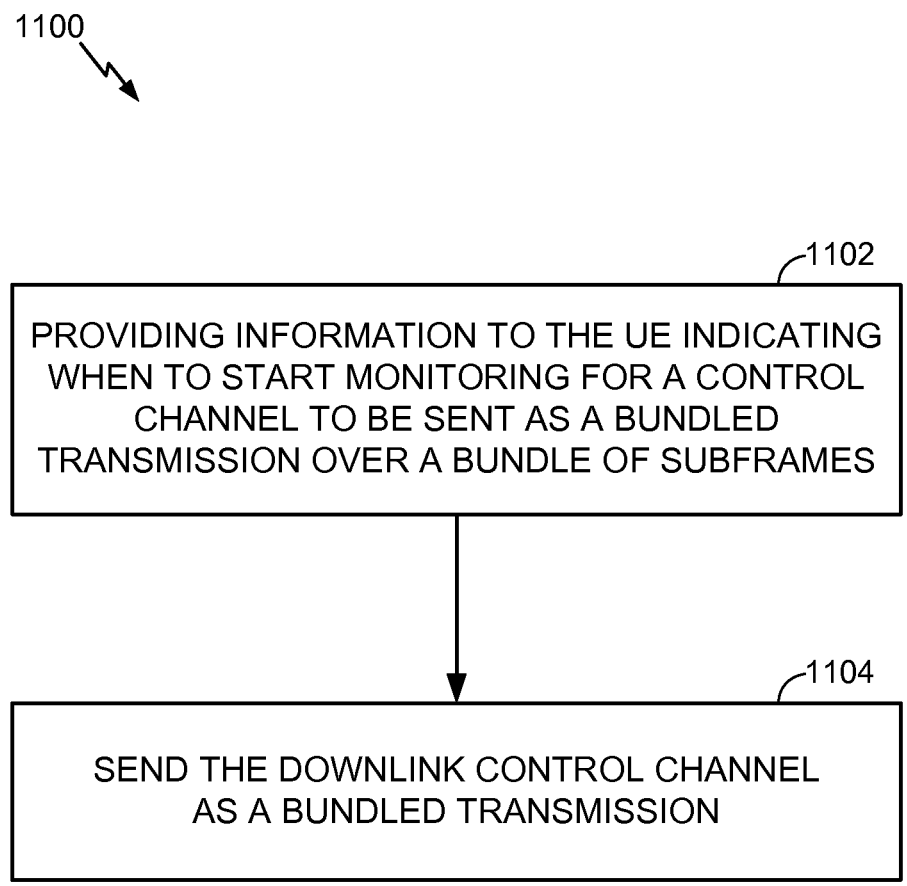
FIG. 11 illustrates example operations for wireless communications, by a base station (BS), in accordance with certain aspects of the present disclosure.

FIG. 11 illustrates example operations 1100, performed by a base station (BS), such as BS 110, for sending a downlink control channel as a bundled transmission over a bundle of subframes. The operations 1100 begin, at 1102, with the BS providing information to the UE indicating when to start monitoring for the control channel. At 1104, the BS sends the downlink control channel as a bundled transmission.

According to certain aspects, providing the information may comprise transmitting a grant, wherein grants are restricted to prevent at least one of parallel reception of data or parallel transmission of data. According to certain aspects, the information indicates multiple possible starting positions, with a discontinuous reception (DRX) on duration, for monitoring for the control channel within the on duration. According to certain aspects, the multiple possible starting positions are separated by at least one transmission time interval (TTI).

According to certain aspects, providing the information comprises signaling of parameters for the DRX operating mode. In some cases, providing the information comprises sending signaling to the UE indicating a bundled transmission is to follow. According to certain aspects, the signaling is provided via one or more bits in a control channel indicating a bundled grant. In some cases, the signaling is provided via one or more bits of a control or data transmission.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining and/or means for monitoring may include one or more processors, such as the receive processor 258, the controller/processor 280 of the user terminal 120 illustrated in FIG. 2. Means for receiving may comprise a receive processor (e.g., the receive processor 258) and/or an antenna(s) 252 of the user terminal 120 illustrated in FIG. 2. Means for providing and means for sending may comprise a transmit processor (e.g., the transmit processor 220) and/or an antenna(s) 234 of the eNB 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of processing a control channel by a user equipment (UE), comprising:
   determining when to start monitoring, within an on duration of a discontinuous reception (DRX) operating mode, for a control channel sent as a bundled transmission over a bundle of subframes, wherein:
      the determining is based, at least in part, on a bundling size of the control channel; and
      the determining comprises determining multiple possible starting positions for monitoring for the control channel within the on duration, wherein the multiple possible starting positions are separated by at least one transmission time interval (TTI); and
   monitoring, based on the determining, for the control channel in a subset of the bundle of subframes.

2. The method of claim 1, wherein the determination is made, at least in part, on at least one of:
   a restriction on downlink grants designed to prevent parallel reception of data; or
   a restriction on uplink grants designed to prevent parallel transmission of data.

3. The method of claim 1, further comprising:
   ceasing to monitor for control channels, within the on duration, after successful decoding of the control channel.

4. The method of claim 1, wherein the determining comprises determining a starting position for monitoring that is at least one of:
   aligned with a first transmission time interval (TTI) of the on duration; or
   aligned with an offset period from a start of the on duration.

5. The method of claim 1, wherein:
   the on duration is longer than the bundling size of the control channel; and
   the multiple possible starting positions are separated by the bundling size.

6. The method of claim 1, wherein the determining comprises:
   finding a start position by decoding in the on duration until the control channel is successfully decoded; and
   decoding one or more subsequent control channels based on the start position.

7. The method of claim 1, wherein the determining comprises:
   determining when to start monitoring for the control channel based on signaling of parameters for the DRX operating mode.

8. The method of claim 1, wherein the determining comprises:
   receiving signaling indicating a bundled transmission is to follow.

9. The method of claim 8, further comprising:
   ceasing to monitor for control channels, for at least some period, in monitoring instances after signaling is not received.

10. The method of claim 8, wherein the signaling is provided via one or more bits in a control channel indicating a bundled grant.

11. The method of claim 8, wherein the signaling is provided via one or more bits of a control or data transmission.

12. The method of claim 1, wherein determining when to start monitoring based, at least in part, on the bundling size of the control channel comprises adjusting a monitoring time according to the bundling size.

13. The method of claim 1, wherein a starting point of the control channel sent as the bundled transmission is aligned with a first transmission time interval (TTI) of the ON duration of the DRX operating mode.

14. A method of transmitting a control channel by a base station, comprising:
   providing information to a user equipment (UE) indicating when to start monitoring, within an on duration of a discontinuous reception (DRX) operating mode, for a control channel to be sent as a bundled transmission over a bundle of subframes, where in:
      the information indicates multiple possible starting positions for monitoring for the control channel within the on duration;

the multiple possible starting positions are based, at least in part, on a bundling size of the control channel; and the multiple possible starting positions are separated by at least one transmission time interval (TTI); and sending the control channel as a bundled transmission.

15. The method of claim 14, wherein providing the information comprises transmitting a grant, wherein grants are restricted to prevent at least one of parallel reception of data or parallel transmission of data.

16. The method of claim 14, wherein:
the on duration is longer than a bundling size of the control channel; and
the multiple possible starting positions are separated by the bundling size.

17. The method of claim 14, wherein providing the information comprises:
signaling of parameters for the DRX operating mode.

18. The method of claim 14, wherein providing the information comprises:
sending signaling to the UE indicating a bundled transmission is to follow.

19. The method of claim 18, wherein the signaling is provided via one or more bits in a control channel indicating a bundled grant.

20. The method of claim 18, wherein the signaling is provided via one or more bits of a control or data transmission.

21. An apparatus for processing a control channel by a user equipment (UE), comprising:
at least one processor configured to:
determine when to start monitoring, within an on duration of a discontinuous reception (DRX) operating mode, for a control channel to be sent as a bundled transmission over a bundle of subframes, wherein the at least one processor is configured to:
determine when to start monitoring based, at least in part, on a bundling size of the control channel; and
determine when to start monitoring by determining multiple possible starting positions for monitoring for the control channel within the on duration, wherein the multiple possible starting positions are separated by at least one transmission time interval (TTI); and
monitor, based on the determining, for the control channel in a subset of the bundle of subframes; and
a memory coupled with the at least one processor.

22. An apparatus for transmitting a control channel by a base station, comprising:
at least one processor configured to:
provide information to a user equipment (UE) indicating when to start monitoring, within an on duration of a discontinuous reception (DRX) operating mode, for a control channel sent as a bundled transmission over a bundle of subframes, wherein:
the information indicates multiple possible starting positions for monitoring for the control channel within the on duration
the multiple possible starting positions are based, at least in part, on a bundling size of the control channel; and
the multiple possible starting positions are separated by at least one transmission time interval (TTI); and
send the control channel as a bundled transmission; and
a memory coupled with the at least one processor.

* * * * *